(12) United States Patent
Lechner et al.

(10) Patent No.: US 8,845,501 B2
(45) Date of Patent: Sep. 30, 2014

(54) PROCESS FOR PRODUCING A ROLL FOR SUPPORTING AND CONVEYING HOT MATERIAL, PROCESS FOR REPAIRING A WORN ROLL

(75) Inventors: Stefan Lechner, Leonding (AT); Marinko Lekic-Ninic, Linz (AT); Johann Poeppl, Kirchschlag (AT); Guoxin Shan, Linz (AT); Heinrich Thoene, Linz (AT); Karl Trnka, Linz (AT); Franz Wimmer, Riedau (AT)

(73) Assignee: Siemens Vai Metals Technologies GmbH (AT)

( * ) Notice: Subject to any disclaimer, the term of this patent is extended or adjusted under 35 U.S.C. 154(b) by 820 days.

(21) Appl. No.: 12/988,856

(22) PCT Filed: Mar. 2, 2009

(86) PCT No.: PCT/EP2009/052445
§ 371 (c)(1),
(2), (4) Date: Mar. 30, 2011

(87) PCT Pub. No.: WO2009/130079
PCT Pub. Date: Oct. 29, 2009

(65) Prior Publication Data
US 2011/0294636 A1    Dec. 1, 2011

(30) Foreign Application Priority Data
Apr. 22, 2008 (AT) ................ A 638/2008

(51) Int. Cl.
*B25F 5/02* (2006.01)
*B23K 25/00* (2006.01)
*B23K 31/00* (2006.01)
*B23K 35/30* (2006.01)
*C22C 38/26* (2006.01)
*B23K 9/04* (2006.01)
*B22D 11/128* (2006.01)
*B23K 35/02* (2006.01)
*C22C 38/18* (2006.01)

(52) U.S. Cl.
CPC ............. *B23K 9/048* (2013.01); *B23K 35/3086* (2013.01); *C22C 38/26* (2013.01); *B23K 2203/04* (2013.01); *B23K 35/30* (2013.01); *B22D 11/1287* (2013.01); *B23K 35/0261* (2013.01); *B23K 35/02* (2013.01); *C22C 38/18* (2013.01); *B23K 2201/04* (2013.01)
USPC ........... 492/54; 219/76.14; 228/162; 228/119

(58) Field of Classification Search
USPC ................ 164/447, 448; 219/72, 73.21, 76.1, 219/121.15; 228/160, 162, 119; 492/44, 54
See application file for complete search history.

(56) References Cited

U.S. PATENT DOCUMENTS 1,493,191 A  *  5/1924  De Golyer .................. 420/1
4,000,010 A      12/1976  Sekimoto et al.
(Continued)

FOREIGN PATENT DOCUMENTS

| CA | 2049794 | 2/1992 |
| CN | 1032305 A | 4/1989 |

(Continued)

OTHER PUBLICATIONS

International Search Report dated Oct. 2, 2009, issued in corresponding international application No. PCT/EP2009/052445.

(Continued)

*Primary Examiner* — Jacob Cigna
(74) *Attorney, Agent, or Firm* — Ostrolenk Faber LLP

(57) ABSTRACT

A roll (1) for supporting and conveying hot material, including a roll element that has a roll jacket (2) made of a basic material and a wear coat which is applied to the basic material by means of a surface welding process (4) using a welding additive which surrounds the surface of the roll jacket. In order to increase the service life of the wear coat, improve the resistance to wear, and reduce the cost for producing the welded-on surface. The basic material of the roll jacket (2) is steel and contains up to 0.45 percent of C. The welded-on surface (4) is designed as a single-layer weld, and the wear coat contains 12.5 to 14.0 percent of Cr at least in an external zone that surrounds the surface of the roll jacket. Also disclosed are a method for producing the roll (1), a method for repairing a used roll (1), a welding additive and a welding rod for producing the welded-on surface.

31 Claims, 3 Drawing Sheets

(56) References Cited

U.S. PATENT DOCUMENTS

| | | | | |
|---|---|---|---|---|
| 4,097,711 | A | * | 6/1978 | Banerjee ............... 219/76.15 |
| 4,143,258 | A | * | 3/1979 | McCann et al. ............ 219/73 |
| 4,404,450 | A | * | 9/1983 | Weldon ............... 219/76.12 |
| 4,484,959 | A | | 11/1984 | Boucher et al. ............ 148/127 |
| 4,532,978 | A | * | 8/1985 | Kuroki et al. ............ 164/448 |
| 4,538,668 | A | * | 9/1985 | Nishihara et al. ............ 164/448 |
| 4,609,577 | A | | 9/1986 | Long |
| 4,733,446 | A | | 3/1988 | Kuroki ............... 29/121.6 |
| 5,766,378 | A | | 6/1998 | Horn ............... 148/526 |
| 5,914,055 | A | * | 6/1999 | Roberts et al. ............ 219/76.15 |
| 6,127,644 | A | * | 10/2000 | Singh et al. ............ 219/73.11 |
| 6,171,222 | B1 | | 1/2001 | Lakeland et al. |

FOREIGN PATENT DOCUMENTS

| | | |
|---|---|---|
| CN | 1686663 | 10/2005 |
| DE | 2513763 A1 | 10/1975 |
| DE | 3223908 A1 | 1/1984 |
| DE | 3823655 A1 | 1/1990 |
| DE | 4027225 A1 | 2/1992 |
| EP | 0 070 773 | 1/1983 |
| EP | 0 312 744 | 4/1989 |
| FR | 2063252 A | 7/1971 |
| GB | 1475300 A | 6/1977 |
| GB | 2122925 A | 1/1984 |
| GB | 2368849 A | 5/2002 |
| JP | 58-184094 A | 10/1983 |
| JP | 62-207580 A | 9/1987 |
| JP | 03-275276 A | 12/1991 |
| JP | 10-006001 A | 1/1998 |
| JP | 10006001 A * | 1/1998 |
| JP | 10314938 A2 | 12/1998 |
| JP | 11-000747 A | 1/1999 |
| JP | 2004-174600 | 6/2004 |
| RU | 2014192 C1 | 6/1994 |
| SU | 903042 | 2/1982 |
| WO | WO 94/00253 A1 | 1/1994 |

OTHER PUBLICATIONS

SMS DEMAG; "Schweißzusätze zum Auftragschweißen"; DIN 8555 Teil 1; pp. 1-8; (1983) (English translation only).

SMS-NORM SN 402; "Auftragschweißen" (1995) (English translation only).

European Written Submission of Appeal dated Nov. 27, 2013, issued in corresponding European Application No. EP2268443B1 with English translation.

Chinese Office Action dated Oct. 25, 2013, issued in corresponding Chinese Patent Application No. 200980123729.5 with an English translation of the relevant portions.

Xijun, Jiang et al., "Build-Up Welding Manufacturing Technology of Wrapper Rolls" Jiangsu Metallurgy, vol. 36, No. 1 (Feb. 2008) pp. 8-12 with an English translation of the relevant portion cited in the Office Action from China.

* cited by examiner

PROCESS FOR PRODUCING A ROLL FOR SUPPORTING AND CONVEYING HOT MATERIAL, PROCESS FOR REPAIRING A WORN ROLL

CROSS-REFERENCE TO RELATED APPLICATIONS

The present application is a 35 U.S.C. §§371 national phase conversion of PCT/EP2009/052445, filed Mar. 2, 2009, which claims priority of Austrian Application No. A638/2008, filed Apr. 22, 2008 the contents of which are incorporated by reference herein. The PCT International Application was published in the German language.

FIELD OF THE INVENTION

The invention relates to a roll for supporting and conveying hot material on a roller table or in a continuous casting machine, said roll having a roll body, which comprises a roll shell of a base material and a wearing layer, which is applied to the base material by build-up welding using a weld filler and encloses the roll shell surface, wherein the base material of the roll shell is steel. The invention also relates to a process for producing and for repairing such a roll having a wearing layer, which is applied to the base material of the roll shell by build-up welding using a weld filler. The invention also comprises a weld filler and a welding wire for producing the build-up weld on a component surface of a roll, which comprises a special weld filler.

Rolls of this type are particularly suitable for supporting and conveying cast metal strands, in particular steel strands, in the strand guide of a continuous casting installation, directly following the continuous casting mold, and on roller tables downstream from the casting installation. Particularly in slab continuous casting installations, the supporting rolls in the strand guide are exposed to high mechanical loading in the high-temperature range. This results in increased wear to the roll shell surface, in corrosion phenomena and in mechanical damage. Rolls of this type can also be used generally in metallurgical installations if heavy and hot materials, such as slabs, blocks, billets, strip material, rolling stock, etc. are conveyed between individual devices for further processing, storage and stacking devices, in particular also in the field of rolling mills.

BACKGROUND OF THE INVENTION

DE 38 23 655 A1 has already disclosed a supporting and/or conveying roll, which substantially consists of a roll core and a roll sleeve which can be screwed into one another, for conveying hot metal strands in a continuous casting installation. A build-up weld is applied to the roll sleeve, the welding parameters for carrying out said build-up welding being selected such that joint welding between the core and sleeve is carried out at the same time as the protective build-up is welded onto the outer lateral surface of the roll sleeve. The build-up weld is formed by weld beads which lie closely adjacent to one another in the axial direction of the supporting roll or in the form of a helical line along the lateral surface of the supporting roll. This provides a wear-resistant surface and a solid join between the sleeve and core.

DE 32 23 908 A1 discloses a strand guide roll, the roll body of which is provided with a build-up weld. The build-up weld comprises a multiplicity of weld beads, which are arranged closely adjacent to one another and are applied in a wave-like manner in the circumferential direction of the roll body. The build-up weld is reworked in order to obtain a smooth, cylindrical surface free from cracks. Information relating to the chemical composition of the base material and of the material of the wearing layer welded on, with a view to optimizing the material properties of the strand guide roll, cannot be gathered from this document.

U.S. Pat. No. 4,532,978 A discloses a conveying roll for hot metal pieces, having an outer surface layer produced by build-up welding, by thermal spraying or by shrink fitting, wherein this outer surface layer is formed from a ferritic steel containing less than 0.1% C, 10.0-14.0% Cr and 0.4-1.0% Nb, remainder iron and manufacturing-related impurities. Improved resistance of the surface layer of a conveying roll to corrosion and oxidation and a reduced susceptibility to cracking are achieved by the combination of the alloy components Cr and Nb. More specific information relating to the structure of the outer surface layer formed by build-up welding cannot be gathered from this document.

Build-up welds are generally characterized by the application of a firmly adhering layer to a component surface via the flow of melt. This layer serves not only for producing a wear-resistant surface or for repairing the latter after it has been used for a specific time, but also primarily for reinforcing (protection against wear), cladding (protection against corrosion) and buffering (formation of interlayers) component surfaces.

During build-up welding, the component base body serves as the carrier with sufficiently elastic properties, while the coating, as the functional surface, should protect the component against damage caused by severe loading, including corrosion, wear and/or temperature. Build-up welding combines advantages, such as low dependence on the component geometry, good adhesion between the carrier material and the coating, dense layers and good conduction of heat by the build-up weld into the component. Considerable economic losses arising from a major outlay on maintenance are presently caused by the abrasive and erosive wear on such components, especially on continuous casting rolls of a continuous casting installation.

By way of example, in order to ensure that the service life required for strand guide rolls is achieved in respect of surface wear, which is currently usually about 300 000 tons of metal strand produced in the inlet region of the strand guide (the region following the mold) or 5 million tons in the outlet region from the strand guide, a build-up weld according to the prior art has to have the following properties:

a rust-free build-up weld with a martensitic microstructure, a hardness of 44-50 HRC, a high level of resistance to corrosion of the weld layer as a result of an alloy component of at least 12.5% Cr, heat checking resistance, the lowest possible delta ferrite content of max. 10%. A delta ferrite content of 0% would be ideal for ensuring a high level of resistance to intercrystalline corrosion. For reasons related to materials and welding, this can only be achieved with difficulty. In practice, a delta ferrite content of up to 10% is therefore acceptable.

These properties should be present at the functional surface close to the surface in a sufficient layer thickness of the build-up weld applied, so that the surface can still be reworked to a high quality once a permissible wear limit has been reached, particularly without the roll shell being damaged or weakened in the region of the base material.

The microstructure formation and quality of this functional surface close to the surface, which is produced by build-up welding, are dependent on the quality of the base material of the roll shell, on the quality of the weld filler and possibly on the build-up welding operation itself. During the welding operation, the molten base material and the weld filler melting away from the welding wire are mixed, which is referred to as dilution. The obtained dilution of the weld filler with the base material is greatly influenced by a spread in material and welding parameters, which is unavoidable in practice. However, the dilution process essentially determines whether the above requirements made on the build-up weld are met.

In order to obtain sufficiently large wearing layers with invariable material properties, it is already known, for example from JP 10-314938 A2, to carry out multi-layer welds. The problem relating to dilution and thus different material properties therefore prominently arises exclusively in the first layer of the build-up weld. This problem no longer arises in the second layer and in the further layers of the build-up weld. However, the time taken to carry out the build-up weld and the amount of energy which the welding unit needs to consume increase significantly according to the number of weld layers.

JP 11-000747 A2 discloses a supporting roll having a single-layer build-up weld, in which only tips of the weld beads are ground down in a subsequent machining operation, this producing a cylindrical lateral surface which, however, has a functional surface which bears the hot conveyed material only in subregions. That surface of the weld beads which is not machined increases the risk of crack formation as a result of nonuniform loading phenomena and nonuniform transfer of heat from the hot conveyed material into the supporting roll. Appropriate information relating to the quality of the build-up weld, in particular relating to the uniformity of the material properties in the build-up weld and the composition of the weld filler, cannot be found in JP 11-000747 A2.

SUMMARY OF THE INVENTION

It is therefore an object of the present invention to avoid the disadvantages of the known prior art and to propose a roll for supporting and conveying hot material, a process for producing and repairing such a roll, and a weld filler and a welding wire or a welding electrode for producing a wearing layer on a corresponding component surface or a roll, in which case the service life of the wearing layer is increased, the resistance to wear is improved and the costs for producing the build-up weld are reduced.

Proceeding from a roll of the type described in the introduction, this object is achieved in that the base material of the roll shell is steel and contains up to 0.45% C, in that the build-up welding is in the form of single-layer welding, and in that the wearing layer contains 12.5 to 14.0% Cr at least in an outer region which encloses the roll shell surface. The base material preferably contains 0.2 to 0.45% C.

All figures relating to alloy components in this document refer to percent by mass.

In principle, the strength of the roll shell is increased by the selection of a base material for the roll shell which contains a steel having a relatively high C, i.e., carbon content. In addition, during build-up welding steels having a relatively high C content behave more sensitively with respect to the consistency in the microstructure composition. By using a weld filler matched specifically to the base material, it is possible to produce a distinct wearing layer, which has a uniform microstructure composition in an outer, extraordinarily thick region, on the base material by build-up welding, which is carried out exclusively as single-layer welding. This wearing layer also has a constant microstructure composition, containing 12.5 to 14.0% Cr, after mechanical surface machining required in a region which encloses the roll shell surface has been carried out. The influence of the natural spread of charge materials during the build-up welding operation, especially the dilution, can be reduced to a controllable degree by the special matching of base material and weld filler even if there is only one weld layer, and therefore a sufficient layer with constant material properties remains for the specific application. The buffer layer which has been required to date in practice for restricting the dilution is thus no longer required.

The material properties of the wearing layer are improved further if the wearing layer contains 0.10 to 0.18% Nb at least in the outer region which encloses the roll shell surface. The addition of Nb to the weld filler means that the single-layer build-up welding process can also be used reliably for the roll base materials having a relatively high C content of up to 0.45%. Niobium sets specifically the carbon of the base materials which have a relatively high carbon content, and therefore ensures the weldability thereof. In the case of base materials having a low carbon content, the niobium content does not prove to be disadvantageous, and so all conventional roll base materials can be welded with one and the same weld filler when Nb is added in the proposed range.

According to a preferred embodiment of the roll, the wearing layer has the following composition at least in the outer region which encloses the roll shell surface:
12.5 to 14.0% Cr
0.10 to 0.18% Nb
3.4 to 4.5% Ni
0.6 to 1.0% Mo
0.12% N
0.7% Si
0.6 to 1.2% Mn
0.06 to 0.14% C
max. 0.025% S
max. 0.025% P
remainder Fe and manufacturing-related impurities,
where the spread of the individual alloy components is +/−5%.

In single-layer build-up welding, it is desirable for the proportion of delta ferrite in the wearing layer to be less than 10%, preferably less than 5%, at least in the outer region which encloses the roll shell surface. The lower the proportion of delta ferrite in the wearing layer, the higher the resistance to intercrystalline corrosion in this region. The proportion of delta ferrite increases with the Cr content, and so a Cr content >14.0% leads to an undesirably high proportion of delta ferrite.

A significant advantage of the roll according to the invention is that the region of the wearing layer which encloses the roll shell surface has a constant chemical composition in a thickness range of at least 1.5 mm, preferably in a thickness range of at least 2.5 mm.

A process for producing a roll for supporting and conveying hot material, in particular continuously cast steel strands, on a roller table or in a continuous casting machine, relates to a roll body, which comprises a roll shell of a base material and a wearing layer, which is applied to the base material by build-up welding using a weld filler, wherein the base material of the roll shell is steel. To achieve the object underlying the invention, the process for producing the roll according to the invention comprises the following consecutive steps:
the roll shell or roll body formed from a base material is prepared as a rotating part,
a build-up weld layer is applied to the base material of the roll shell by single-layer build-up welding with a minimum thickness of the build-up weld layer of 3.5 mm,
the build-up weld layer is turned back on a closed, unifacial roll shell surface while maintaining a minimum thickness of the wearing layer having an identical chemical composition of 1.5 mm or more.

The build-up weld layer is expediently applied to the base material of the roll shell or of the roll body by single-layer build-up welding with a minimum thickness of the build-up weld layer of 4.0 mm or more, in order to obtain a sufficiently large wearing layer having an identical chemical composition. The build-up weld layer is preferably turned back on a closed, unifacial roll shell surface while maintaining a minimum thickness of the wearing layer having an identical chemical composition of 2.5 mm or more, as a result of which an appropriately long service life of the wearing layer is achieved.

Steel containing up to 0.45% C, preferably containing 0.2 to 0.45% C, is used as the base material of the roll shell. An iron-based weld filler having a Cr content of 16.5 to 19.0% is used for the build-up welding. The weld filler expediently additionally contains 0.15 to 0.20% Nb.

In order to obtain a wearing layer having an identical chemical composition over the greatest possible thickness range, so that defined dilution takes place during the melting operation of the two material components, it is necessary to match the base material of the roll shell, the weld filler and the welding process used with its specific welding parameters to one another. A single-layer build-up weld which is optimal under these boundary conditions is obtained using the open arc build-up welding process, the submerged arc build-up welding process or an inert gas welding process. An inexpensive build-up welding process which is easy to use for the specific application is the open arc build-up welding process.

Wearing layers which can be used for the roll insert and have the greatest possible thickness range having an identical chemical composition are obtained if a weld filler having the following chemical composition is used for the build-up welding:
16.5 to 19.0% Cr
0.15 to 0.20% Nb
4.0 to 4.5% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.
A weld filler having this chemical composition ensures that a low degree of dilution occurs in the case of a single-layer build-up weld and that the wearing layer has a particularly stable structure.

Wearing layers which can be used for the roll insert and have the greatest possible thickness range having an identical chemical composition are obtained with preference if a weld filler having the following chemical composition is used for the build-up welding:
16.5 to 17.0% Cr
0.15 to 0.20% Nb
4.0% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.
In the case of a weld filler having this chemical composition, it is possible to set the dilution in the case of a single-layer build-up weld to a value of 25 to 30%.

Wearing layers which can likewise be used to a particular extent for the roll insert and have the greatest possible thickness range having an identical chemical composition are obtained if a weld filler having the following chemical composition is used for the build-up welding:
18.5 to 19.0% Cr
0.15 to 0.20% Nb
4.5% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.
In the case of a weld filler having this chemical composition, it is possible to set the dilution in the case of a single-layer build-up weld to a value of 30 to 35%.

Depending on the build-up welding process used, i.e. the open arc build-up welding process, the submerged arc build-up welding process or an inert gas welding process (MAG process), and depending on the welding units used, various degrees of dilution can be obtained. Overall, it is possible to obtain optimum build-up welding results using a minimum of specially composed weld fillers if particularly suitable weld fillers are assigned to specific ranges of degrees of dilution. In particular, it has been found that especially resistant wearing layers can be produced on the base materials in question with two dilution ranges, specifically the dilution range of 25% to 30% and the dilution range of 30% to 35%, with two specific weld fillers. Under these conditions, it is possible, using a single-layer build-up weld, to achieve wearing layer thicknesses and chemical and mechanical properties of the wearing layer which are comparable to those achieved in the case of two-layer or multi-layer build-up welding according to the prior art.

This process of first applying a wearing layer to the lateral surface of a roll can equally be used as a repair process for a roll which has already become worn during operation of the installation, if sufficient base material is still present for the application of a single-layer build up weld on the roll shell, after the worn surface regions have been turned, to an extent that a cleaner surface is obtained.

Once a roll of the type according to the invention, which is provided with a roll build-up weld, or a roll with a different build-up weld or design has reached the maximum permissible wear values during operation of the installation, it is prepared for a further use cycle by repair welding. This process for repairing a worn roll also takes place with a single-layer weld, with the advantages of reduced working time, reduced energy consumption and thus as a whole significantly reduced repair costs.

The process for repairing a roll of the type described, which has become worn during operation, by build-up welding is carried out by the sequence of the following process steps:

the damaged wearing layer is turned to a dimension of the roll body formed from the base material, a wearing layer is applied by single-layer build-up welding with a minimum thickness of the build-up weld layer of 3.5 mm or more, the build-up weld layer is turned back on a closed, unifacial roll shell surface while maintaining a minimum thickness of the wearing layer having an identical chemical composition of 1.5 mm or more.

The build-up weld layer is expediently applied to the base material of the roll shell or of the roll body by single-layer build-up welding with a minimum thickness of the build-up weld layer of 4.0 mm or more, in order to obtain a sufficiently large wearing layer having an identical chemical composition. The build-up weld layer is preferably turned back on a closed, unifacial roll shell surface while maintaining a minimum thickness of the wearing layer having an identical chemical composition of 2.5 mm or more, as a result of which an appropriately long service life of the wearing layer is achieved.

The roll diameter of a roll available for building up a wearing layer again after the damaged wearing layer has been turned is decisively dependent on the type of damage which has occurred and on the permissible wear. In order to obtain the same chemical composition and the same mechanical properties of the wearing layer using the same weld filler as that used for the first build-up weld, it is necessary in any case to remove the damaged or worn wearing layer down to the base material of the roll body or of the roll shell. It is therefore also necessary to remove the penetration zone of the first build-up weld. Without additional measures, this results in a repaired roll with a reduced external diameter, but also identical quality features.

Particularly in a continuous casting installation, it is advantageous to always replace rolls with rolls having the same diameter, in order to maintain a casting operation under constant production conditions. This is achieved in a simple manner by the repair process according to the invention in that, after the damaged wearing layer is turned to a dimension of the roll body or roll shell formed from the base material, a build-up layer is formed on the base material by build-up welding, on which layer the wearing layer is then built up by single-layer build-up welding, the layer thickness of the build-up layer being selected such that the external diameter of the repaired roll corresponds to the external diameter of the original roll. This means that the wearing layer is built up during the repair process with the same layer thickness as when the wearing layer is built up for the first time on the base material of the roll.

The weld filler used to form the build-up layer expediently has the same chemical composition as the base material of the roll body or of the roll shell, or consists of unalloyed steel, as a result of which the starting conditions and therefore the chemical and mechanical properties of the wearing layer and the layer thickness thereof and therefore the service life of the roll remain unchanged.

When the process for repairing a roll which has become worn during operation is used for supporting and conveying hot material, the chemical composition of the weld filler and the requirements made on the build-up welding process with respect to the selection of the welding process and the conditions under which it is carried out remain unchanged, since the base material is unchanged. Additional conditions for the process for repairing a worn roll therefore correspond identically to those conditions for the process for producing a roll having a single-layer build-up weld applied first.

The invention also relates to a weld filler for producing a build-up weld on a component surface, preferably on a roll shell of a roll for supporting and conveying hot material, in particular continuously cast steel strands, on a roller table or in a continuous casting machine, wherein the component surface or the roll shell of the roll is made of steel and contains up to 0.45% C, in particular 0.2 to 0.45% C. In order to achieve the object underlying the invention, the iron-based weld filler contains 16.5 to 19.0% Cr. It preferably additionally contains 0.15 to 0.20% Nb.

A weld filler which is particularly suitable for the specific field of use of the component surface or of the roll and is matched to the base material has the following chemical analysis: 16.5 to 19.0% Cr; 0.15 to 0.20% Nb; 4.0 to 4.5% Ni; 1.0% Mo; 0.12% N; 0.7% Si; 1.2% Mn; 0.03% C; max. 0.025% S; max. 0.025% P; remainder Fe and manufacturing-related impurities, where the spread of the individual alloy components is +/−5%.

In the case of a weld filler containing 16.5 to 17.0% Cr; 0.15 to 0.20% Nb; 4.0% Ni; 1.0% Mo; 0.12% N; 0.7% Si; 1.2% Mn; 0.03% C; max. 0.025% S; max. 0.025% P; remainder Fe and manufacturing-related impurities, where the spread of the individual alloy components is +/−5%, it is possible to set the dilution with a single-layer build-up weld to a value of 25 to 30%. In the case of a spread of +/−5%, the tolerable value for the Si content of 0.7% accordingly lies between 0.665% and 0.735% Si.

In the case of a weld filler containing 18.5 to 19.0% Cr; 0.15 to 0.20% Nb; 4.5% Ni; 1.0% Mo; 0.12% N; 0.7% Si; 1.2% Mn; 0.03% C; max. 0.025% S; max. 0.025% P; remainder Fe and manufacturing-related impurities, where the spread of the individual alloy components is +/−5%, it is possible to set the dilution with a single-layer build-up weld to a value of 30 to 35%.

A welding wire for carrying out build-up welding on a component surface, preferably on a roll shell of a roll for supporting and conveying hot material, in particular continuously cast steel strands, on a roller table or in a continuous casting machine, is characterized in that the welding wire comprises a weld filler having a disclosed chemical composition. In this case, the welding wire is configured in such a manner that it is suitable for mechanical use in an open arc build-up welding process, in a submerged arc build-up welding process or in an inert gas welding process.

BRIEF DESCRIPTION OF THE DRAWINGS

Further advantages and features of the present invention will become apparent from the following description of non-limiting exemplary embodiments, reference being made to the figures which follow and in which.

EMBODIMENTS OF THE INVENTION

The component surface or the roll shell of a roll for supporting and conveying hot material, in particular continuously cast products, contains steel as the base material. Component surfaces and roll shells for the build-up weld according to the invention preferably consist of 42CrMo4 or 16CrMoV511 according to DIN 10083, and are quenched and tempered. A further, more favorable base material for this application is St52-3, according to DIN 10025.

EXAMPLE

In the case of single-layer build-up welding on a roll shell consisting of 42CrMo4 using a weld filler containing 0.03% C, 0.7% Si, 17.5% Cr, 4.0% Ni, 1.2% Mn, 1.0% Mo, 0.17% Nb and 0.12% N, a wearing layer having an identical chemical analysis in a layer thickness of 3.0 mm remains after the build-up weld layer is turned back on a closed, unifacial roll shell surface. This wearing layer then has the following chemical composition: 13.87% Cr; 0.15% Nb; 4.0% Ni; 0.61% Mo; 0.10% N; 0.54% Si; 0.96% Mn; 0.06% C; 0.001% S; 0.043% P; remainder iron and manufacturing-related impurities.

Figure 1:
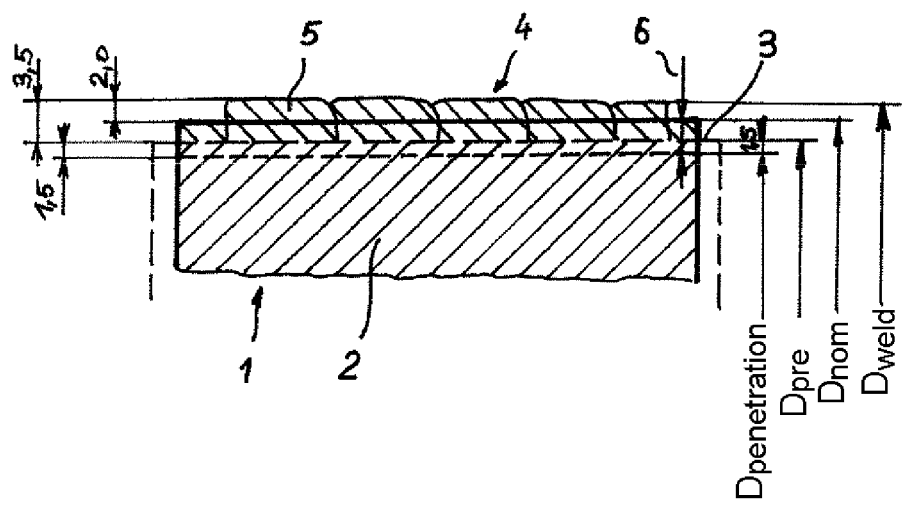
FIG. 1 shows the geometric relationships during the production of a wearing layer by single-layer welding on a roll for supporting and conveying hot material.
Figure 2:
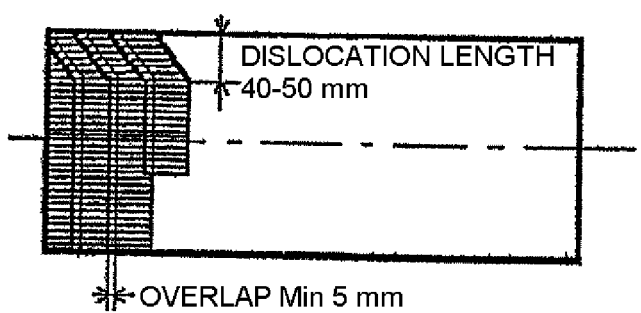
FIG. 2 shows the course of the build up of weld beads on the roll shell surface on a roll for supporting and conveying hot material.

The build-up weld is applied to the roll shell surface, which is preheated to 100° C., on the basis of the open arc welding process, with a welding wire having a wire diameter of 2.4 mm and a feed rate of the welding wire of 6.0 m/min. The build-up welding takes place with a swing frequency of the welding torch of 35 cycles/min and a swing width of 25 mm, the weld beads overlapping by 5 mm. An individual welding wire is always used. FIGS. 1 and 2 show the geometric relationships in more detail.

FIG. 1 shows a partial section of a roll shell 2, which is produced from the base material (St52-3), of a strand guide roll 1 having a roll shell surface 3 prepared to the pre-turning dimension $D_{pre}$. The single-layer build-up weld 4 is applied thereto, as described above, and is used to produce a helically peripheral weld bead 5, the roll diameter increasing to the weld diameter $D_{weld}$ and a layer thickness of 3.5 mm being applied. At the same time, a penetration measuring 1.5 mm is formed to the penetration diameter $D_{penetration}$. After the build-up weld is turned back to an extent of 2 mm down to the nominal roll diameter $D_{nom}$, a wearing layer 6 having a layer thickness of 3 mm with a substantially identical chemical composition and identical material properties remains. The swing width is 25 mm.

FIG. 2 shows the build up of weld beads on the roll shell surface, with the peripheral weld bead on the roll shell having the overlap of about 5 mm and a dislocation length in a length range of about 40 to 50 mm, measured on the circumference of the roll.

Figure 3:
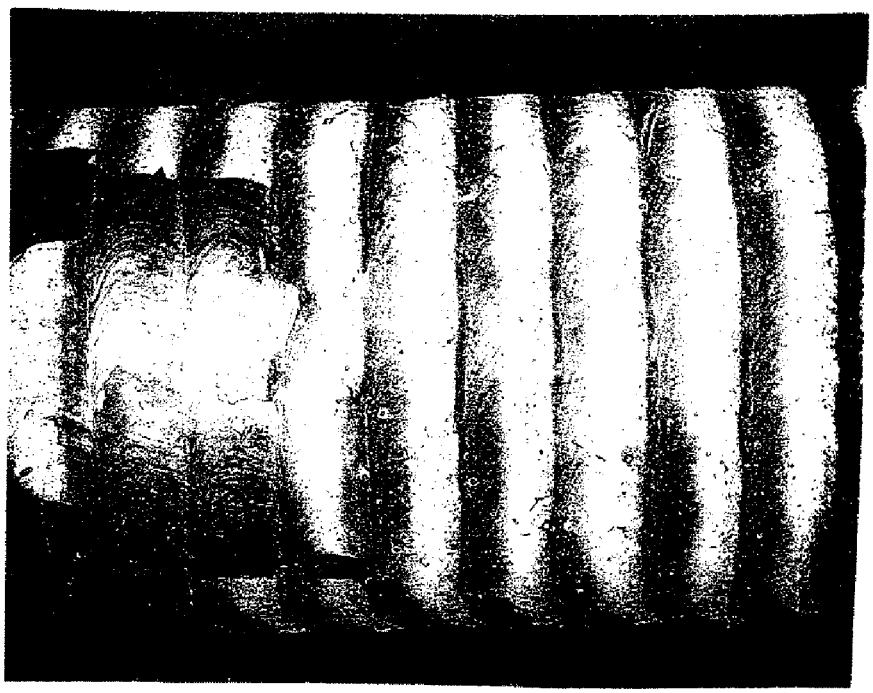
FIG. 3 shows the surface of the build-up weld on a component surface or roll.
Figure 4:
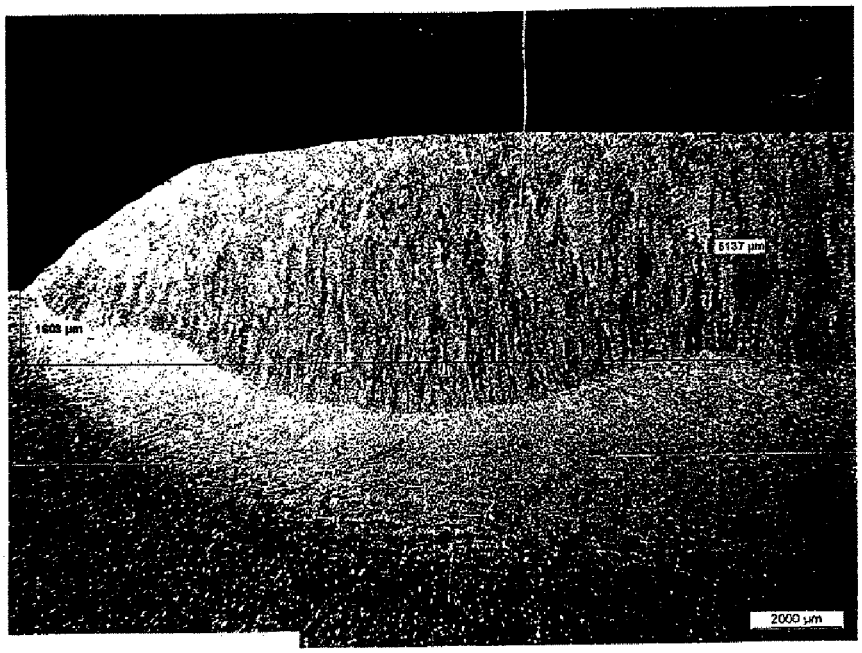
FIG. 4 shows a microsection of the welded join.

FIG. 3 is a photograph showing the surface of the build-up weld with overlapping weld beads corresponding to the weld diameter $D_{weld}$ in FIG. 1. FIG. 4 is a microsection showing the quality of the build-up weld and the high-quality bond of the weld filler to the base material in the penetration zone.

Figure 5:
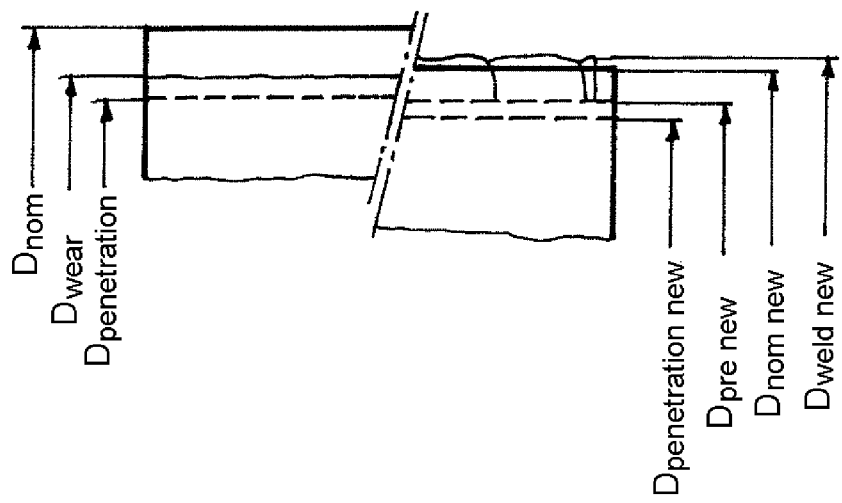
FIG. 5 shows the geometric relationships during the production of a wearing layer by single-layer welding when repairing a roll for supporting and conveying hot material.
Figure 6:
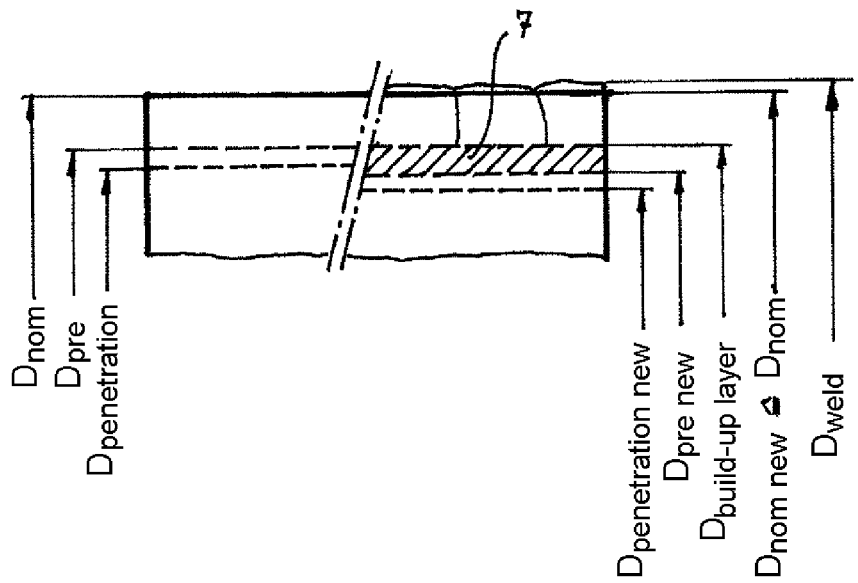
FIG. 6 shows the geometric relationships during the production of a wearing layer by single-layer welding on a build-up layer when repairing a roll for supporting and conveying hot material.

FIGS. 5 and 6 show, in two exemplary embodiments, possible ways to implement the process for repairing a roll, which has become worn during ongoing operation of a continuous casting installation, for supporting and conveying a hot metal strand.

The left half of the image in FIG. 5 shows a strand guide roll having a wearing layer produced by single-layer build-up welding. The wearing layer is delimited in its radial extent by the nominal diameter $D_{nom}$ of the roll and the penetration diameter $D_{penetration}$. The wear diameter $D_{wear}$, which indicates the roll diameter over the course of the service life of the roll, is additionally shown. In this state, the roll is subjected to the repair process shown in the right half of the image. The roll is turned to the pre-turning diameter $D_{pre\ new}$, which is present within the base material of the roll body. A helically peripheral weld bead is produced using the weld filler on this prepared roll shell surface, the roll diameter increasing to the weld diameter $D_{weld\ new}$. At the same time, a new penetration zone, which is delimited by the penetration diameter $D_{penetration\ new}$, forms in the base material of the roll body. The surface of the weld beads is then turned back to the new nominal roll diameter $D_{nom\ new}$, which, however, is smaller than the nominal roll diameter before the repair process is carried out.

FIG. 6 shows an extended process for repairing a worn roll, in which process the original nominal diameter of the strand guide roll is also achieved again by the application of a build-up layer after the repair process is carried out. The left half of the image shows the starting position analogous to FIG. 5, the pre-turning diameter $D_{pre}$ indicating the starting diameter for the single-layer build-up weld applied first. According to the illustration in the right half of the image, the roll is turned to a pre-turning diameter $D_{pre\ new}$, which is present within the base material of the roll body. A build-up layer 7 is formed on this prepared roll shell surface in one or more weld layers, using a weld filler corresponding to the chemical composition of the base material of the roll body. By way of example, St52-3 is likewise used as weld filler on a roll body of St52-3 for the build-up layer. The thickness of this build-up layer is oriented toward the desired nominal roll diameter $D_{nom\ new}$, which should correspond to the original nominal diameter $D_{nom}$. Accordingly, the build-up layer is welded on by build-up welding to a build-up layer diameter $D_{build-up\ layer}$, if appropriate taking additional surface machining into account, which corresponds to the pre-turning diameter $D_{pre}$ for the single-layer build-up weld applied first. Therefore, the same starting conditions as those present for the single-layer build-up weld applied first are provided in turn for the single-layer build-up weld which forms the wearing layer. After the single-layer build-up welding is carried out using the weld filler according to the invention, turning back finally takes place to the new nominal diameter $D_{nom\ new}$, which corresponds to the original nominal diameter $D_{nom}$.

As long as the roll body or the roll shell has a sufficient layer thickness of base material, this process for repairing a worn roll can be repeated many times.

The invention claimed is:

1. A process for producing a roll for supporting and conveying hot material on a roller table or in a continuous casting machine, the roll having a roll body, which comprises:
    a roll shell of a base material and a roll shell surface; and
    a wearing layer, which has been applied to the base material by build-up welding using a weld filler, wherein the base material of the roll shell is steel,
    the process comprising the following steps:
    forming the roll shell or roll body from a base material as a rotating part,
    applying a build-up weld layer to the base material by single-layer build-up welding with a minimum thickness of the build-up weld layer of 3.5 mm,
    turning back the build-up weld layer on a closed, unifacial roll shell surface while maintaining a minimum thickness of the wearing layer of 1.5 mm or more, wherein the wearing layer has an identical chemical composition through the minimum thickness, and
    wherein the single layer build-up welding is carried out by open arc build-up welding process.

2. The process as claimed in claim 1, wherein the build-up welding on the base material produces a minimum thickness of the build-up weld layer of 4.0 mm or more.

3. The process as claimed in claim 1, wherein the build-up weld layer is turned back on a closed, unifacial roll shell surface while maintaining a minimum thickness of the wearing layer of 2.5 mm or more, wherein the wearing layer has an identical chemical composition through the minimum thickness.

4. The process as claimed in claim 1, further comprising the base material of the roll shell comprises steel containing up to 0.45% C.

5. The process as claimed in claim 1, further comprising the weld filler having the following composition for the build-up welding:
18.5 to 19.0% Cr
0.15 to 0.20% Nb
4.5% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.

6. The process as claimed in claim 1, further comprising the base material of the roll shell comprises steel containing 0.2 to 0.45% C.

7. The process as claimed in claim 1, wherein the process is carried out to produce continuously cast steel strands.

8. The process as claimed in claim 1, further comprising the build-up welding comprises an iron-based weld filler having a Cr content of 16.5 to 19.0%.

9. The process as claimed in claim 8, wherein the weld filler additionally contains 0.15 to 0.20% Nb used for the build-up welding.

10. The process as claimed in claim 8, further comprising a weld filler having the following composition for the build-up welding:
16.5 to 19.0% Cr
0.15 to 0.20% Nb
4.0 to 4.5% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.

11. The process as claimed in claim 9, further comprising a weld filler having the following composition for the build-up welding:
16.5 to 17.0% Cr
0.15 to 0.20% Nb
4.0% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.

12. A process for producing a roll for supporting and conveying hot material on a roller table or in a continuous casting machine, the roll having a roll body, which comprises:
a roll shell of a base material and a roll shell surface; and
a wearing layer, which has been applied to the base material by build-up welding using a weld filler, wherein the base material of the roll shell is steel,
the process comprising the following steps:
forming the roll shell or roll body from a base material as a rotating part,
applying a build-up weld layer to the base material by single-layer build-up welding with a minimum thickness of the build-up weld layer of 3.5 mm,
turning back the build-up weld layer on a closed, unifacial roll shell surface while maintaining a minimum thickness of the wearing layer of 1.5 mm or more, wherein the wearing layer has an identical chemical composition through the minimum thickness,
wherein a weld filler having the following composition for the build-up welding:
16.5 to 19.0% Cr
0.15 to 0.20% Nb
4.0 to 4.5% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%,
wherein the build-up welding comprises an iron-based weld filler having a Cr content of 16.5 to 19.0% and
wherein the weld filler additionally contains 0.15 to 0.20% Nb used for the build-up welding.

13. The process as claimed in claim 12, wherein the build-up welding on the base material produces a minimum thickness of the build-up weld layer of 4.0 mm or more.

14. The process as claimed in claim 12, wherein the build-up weld layer is turned back on a closed, unifacial roll shell surface while maintaining a minimum thickness of the wearing layer of 2.5 mm or more, wherein the wearing layer has an identical chemical composition through the minimum thickness.

15. The process as claimed in claim 12, further comprising the base material of the roll shell comprises steel containing up to 0.45% C.

16. The process as claimed in claim 12, further comprising the base material of the roll shell comprises steel containing 0.2 to 0.45% C.

17. The process as claimed in claim 12, wherein the process is carried out to produce continuously cast steel strands.

18. A process for producing a roll for supporting and conveying hot material on a roller table or in a continuous casting machine, the roll having a roll body, which comprises:
a roll shell of a base material and a roll shell surface; and
a wearing layer, which has been applied to the base material by build-up welding using a weld filler, wherein the base material of the roll shell is steel, the process comprising the following steps:
forming the roll shell or roll body from a base material as a rotating part,
applying a build-up weld layer to the base material by single-layer build-up welding with a minimum thickness of the build-up weld layer of 3.5 mm,
turning back the build-up weld layer on a closed, unifacial roll shell surface while maintaining a minimum thickness of the wearing layer of 1.5 mm or more, wherein the wearing layer has an identical chemical composition through the minimum thickness,
wherein the weld filler has the following composition for the build-up welding:
16.5 to 17.0% Cr
0.15 to 0.20% Nb
4.0% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5% and
wherein the build-up welding comprises an iron-based weld filler having a Cr content of 16.5 to 19.0% and wherein the weld filler additionally contains 0.15 to 0.20% Nb used for the build-up welding.

19. The process as claimed in claim 18, wherein the build-up welding on the base material produces a minimum thickness of the build-up weld layer of 4.0 mm or more.

20. The process as claimed in claim 18, wherein the build-up weld layer is turned back on a closed, unifacial roll shell surface while maintaining a minimum thickness of the wearing layer of 2.5 mm or more, wherein the wearing layer has an identical chemical composition through the minimum thickness.

21. The process as claimed in claim 18, further comprising the base material of the roll shell comprises steel containing up to 0.45% C.

22. The process as claimed in claim 18, further comprising the base material of the roll shell comprises steel containing 0.2 to 0.45% C.

23. The process as claimed in claim 18, wherein the process is carried out to produce continuously cast steel strands.

24. A process for producing a roll for supporting and conveying hot material on a roller table or in a continuous casting machine, the roll having a roll body, which comprises:
a roll shell of a base material and a roll shell surface; and
a wearing layer, which has been applied to the base material by build-up welding using a weld filler, wherein the base material of the roll shell is steel,
the process comprising the following steps:
forming the roll shell or roll body from a base material as a rotating part,
applying a build-up weld layer to the base material by single-layer build-up welding with a minimum thickness of the build-up weld layer of 3.5 mm,
turning back the build-up weld layer on a closed, unifacial roll shell surface while maintaining a minimum thickness of the wearing layer of 1.5 mm or more, wherein the wearing layer has an identical chemical composition through the minimum thickness,
wherein the weld filler has the following composition for the build-up welding:
18.5 to 19.0% Cr
0.15 to 0.20% Nb
4.5% Ni
1.0% Mo
0.12% N
0.7% Si
1.2% Mn
0.03% C
max. 0.025% S
max. 0.025% P
remainder Fe and manufacturing-related impurities,
where the spread of the individual alloy components is +/−5%.

25. The process as claimed in claim 24, wherein the build-up welding on the base material produces a minimum thickness of the build-up weld layer of 4.0 mm or more.

26. The process as claimed in claim 24, wherein the build-up weld layer is turned back on a closed, unifacial roll shell surface while maintaining a minimum thickness of the wearing layer of 2.5 mm or more, wherein the wearing layer has an identical chemical composition through the minimum thickness.

27. The process as claimed in claim 24, further comprising the base material of the roll shell comprises steel containing up to 0.45% C.

28. The process as claimed in claim 24, further comprising the base material of the roll shell comprises steel containing 0.2 to 0.45% C.

29. The process as claimed in claim 24, wherein the process is carried out to produce continuously cast steel strands.

30. The process as claimed in claim 24, further comprising the build-up welding comprises an iron-based weld filler having a Cr content of 16.5 to 19.0%.

31. The process as claimed in claim 30, wherein the weld filler additionally contains 0.15 to 0.20% Nb used for the build-up welding.

* * * * *